United States Patent [19]

Hensley

[11] 4,017,394
[45] Apr. 12, 1977

[54] WATER SCREEN

[76] Inventor: Roy A. Hensley, Ford, Kans. 67842

[22] Filed: May 12, 1975

[21] Appl. No.: 576,682

[52] U.S. Cl. .............................. 210/157; 210/242 R
[51] Int. Cl.² ........................................ B01D 33/06
[58] Field of Search ........................... 210/153–159, 210/242, 402, 403, 407, 409, 433

[56] References Cited

UNITED STATES PATENTS

| 788,511 | 5/1905 | Besseberg | 210/157 |
| 793,720 | 7/1905 | Godbe | 210/402 X |
| 1,195,988 | 8/1916 | Hope | 210/157 |
| 1,210,759 | 1/1917 | Breddin | 210/156 |
| 1,516,693 | 11/1924 | Anthony | 210/242 R |
| 2,022,336 | 11/1935 | Bower | 210/157 |
| 2,056,445 | 10/1936 | Damman | 210/157 |
| 2,223,104 | 11/1940 | Hansen | 210/157 |
| 3,843,520 | 10/1974 | Bottorf | 210/242 |

Primary Examiner—Theodore A. Granger
Attorney, Agent, or Firm—John H. Widdowson

[57] ABSTRACT

A water-powered, self-cleaning rotary strainer for use in drawing water from a running stream. A perforated drum is rotatably mounted on a frame. Drum rotation is done by using moving water. A float is mounted on the frame to support the drum in a partially submerged condition. Water is withdrawn from the interior of the drum through a conduit as the drum rotates and debris is passed around the drum.

6 Claims, 5 Drawing Figures

U.S. Patent     April 12, 1977     4,017,394
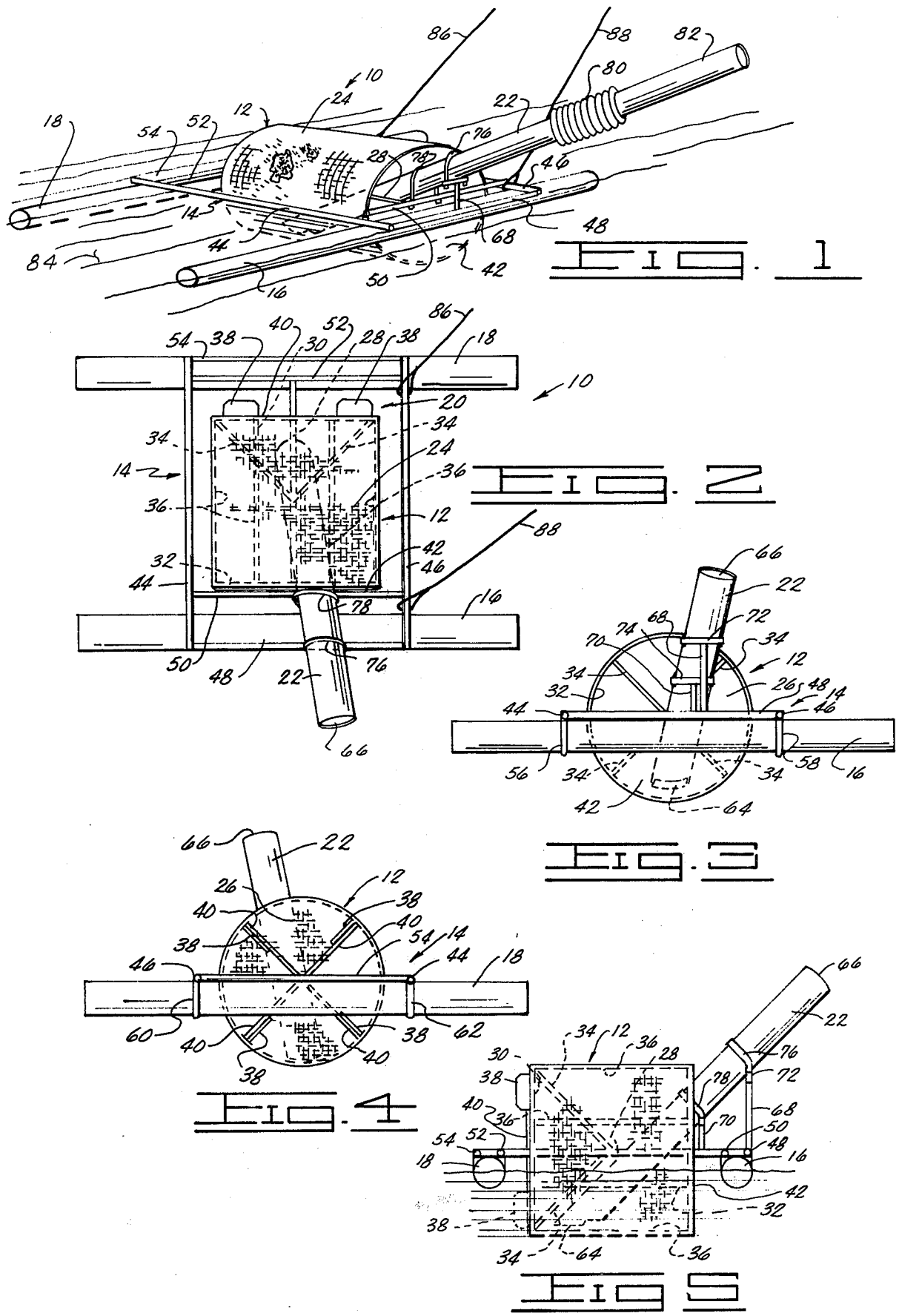

WATER SCREEN

BACKGROUND OF THE INVENTION

This invention is related to stream-powered water filters of the rotatable type wherein water is withdrawn from the interior of a rotatable member. More specifically, the invention is related to a water filter used for removing irrigation water from a stream, river, or other running body of water wherein the filter is powered by the water current in the running body of water. Several types of rotary screens and water filters are known in the prior art for filtering debris where water is removed from a river or a standing body of water. In these devices the strainer is in the form of a perforate drum which must be rotated by an external power source and sprayed from the inside with a stream of water for cleaning debris from the strainer. Debris removers are known in the art for removing debris from water as it moves through an irrigation channel. These devices are water-powered and remove debris or trash from the water, however, they have no provisions for removing filtered water from within the strainer and they must be constructed in a ground-mounted water channel. In areas where river water or stream water is used for irrigation purposes the water is generally pumped directly from the stream or river into the irrigating channel or sprinkler system in a field. In this use the inlet of the conduit from the stream to the pump must be provided with a filter in order to prevent debris, trash, and foreign material from entering the conduit and thus entering the pump because such material could damage the pump. In the prior art it is common to provide a screen around the inlet of such a conduit, however, in heavily debris laden streams or rivers the screen quickly plugs with debris and foreign material thereby reducing or substantially stopping water flow into the pump. When this condition occurs, the pump must be stopped and the debris removed from the stationary screen by hand before irrigation can continue.

SUMMARY OF THE INVENTION

In an embodiment of this invention a water screen is provided which has a stream-powered rotary filter member which can be positioned in running water to facilitate the removal of filtered water for irrigation purposes as described above. A filter in the form of a cylindrical perforated drum is rotatably mounted on a frame which is supported by a float in a river or stream. The drum has a means to rotate itself by using power of the moving water. A conduit mounted with the frame and extending into the drum provides a filtered inlet for a conduit to an irrigation pump at a remote location. Moving water of the stream or river rotates the drum, thus passing debris around the drum and clear of the inlet to the conduit. In use the drum is positioned in a partially submerged condition and the means to rotate the drum rotate it regardless of whether or not water is being pumped from the interior of the drum.

One object of this invention is to provide a water screen overcoming the disadvantages of the prior art devices.

Still, one object of this invention is to provide a water screen structure which is floatable in a river, stream, or the like and usable as a filter for pumped irrigation systems.

Yet, another object of this invention is to provide a water screen which has a rotatably mounted cylindrically shaped drum with paddles secured to one end thereof which will rotate when placed in moving water to provide a rotary strainer or filter which will allow filtered water to be removed from inside the drum.

Various other objects, advantages, and features of this invention will become apparent to those skilled in the art from the following discussion taken in conjunction with the accompanying drawing, in which:

DESCRIPTION OF THE DRAWING

FIG. 1 is a perspective view of the water screen taken from above with the water screen operatively positioned in running water and connected to a segment of a conduit;

FIG. 2 is a top plan view of the water screen structure alone;

FIG. 3 is an end elevation view of the water screen taken from the end having the outlet conduit;

FIG. 4 is an end elevation view of the water screen taken from the end opposite to that shown in FIG. 3; and FIG. 5 is a side elevation view of the water screen with the drum frame shown in dashed lines and the water level shown for reference.

The following is a discussion and description of preferred specific embodiments of the water screen of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Referring to the drawing in detail and in particular to FIG. 1 in which a running body of water is shown with the water screen of this invention floating therein. The water screen of this invention is indicated generally at 10 and includes a rotatable perforate drum 12 mounted on a frame assembly 14. The frame assembly 14 has a pair of floats 16 and 18 mounted thereon for supporting the water screen in a river, stream, or other moving body of water. Drum 12 has a plurality of paddles mounted on one end thereof to provide a means of rotating the drum by utilizing water power. A conduit 22 is rigidly mounted on the frame assembly 14 and extends into drum 12 to provide an outlet for withdrawing water from the interior of the drum assembly.

The drum assembly 12 has a frame which is covered with a perforate mesh material over its sidewall 24 and on one end 26. The drum frame has an axle 28 extending therethrough along the longitudinal axis of the generally cylindrically shaped drum. Axle 28 is rotatably mounted on the frame assembly. Preferably drum 12 is cylindrical with a round cross section. Round hoop-like members 30 and 32 defined the shape of the ends of drum 12. A plurality of braces indicated at 34, join axle 28 and hoop-like member 30. A plurality of side forming members 36 join the hoop-like members 30 and 32 to define the exterior shape of cylindrical side wall 24. Brace members 34 are connected between a mid portion of axle 28 and hoop-like member 30 as shown clearly in FIGS. 2 and 5. The plurality of paddles indicated generally at 20, preferably consists of four individual paddles, indicated at 38 and mounted on paddle support members 40 which are secured to the closed end of drum 12. Paddle support members 40 are rigidly secured to hoop-like member 30 and positioned on the exterior of perforate drum end 26. Paddle support members 40 cross at axle 28 and are secured to the axle in order to transmit forces directly to axle 28 for rotation of the drum. At the open end of drum 12 an end plate member 42 is positioned covering the lower normally submerged portion of the drum. End plate member 42 is rigidly secured to frame 14 and essentially semicircularly shaped. End plate member 42 is positioned closely adjacent to the outside of the open end of drum 12. As drum 12 rotates hoop-like member 32 moves adjacent to end plate member 42. Spacing between end plate 42 and the open end of drum 12 is perferably quite small to prevent the entrance of debris into the drum.

Frame 14 includes a pair of elongated members 44 and 46 which span floats 16 and 18 and are positioned on opposite sides of drum 12. Frame 14 also has a plurality of transverse members connecting elongated frame members 44 and 46. Transverse frame members 48 and 50 are located at the open end of drum 12 as shown in FIG. 2. Transverse frame members 52 and 54 are positioned at the closed end portion of drum 12 at float 18. Float 16 is an elongated buoyant member which is secured to frame 14 by straps 56 and 58 which are positioned around underneath float 16 and secured to elongated frame members 44 and 46, respectively. Likewise float 18 is an elongated very buoyant member and it is secured to frame 14 by straps 60 and 62 which extend around underneath float 18 and are secured to elongated frame members 46 and 44, respectively. Floats 16 and 18 are preferably elongated and slender buoyant members substantially as shown so they will have a tendency to align with the current in the moving water particularly when the drum is rotating.

Conduit 22 provides the means for removing water from within drum 12. Conduit 22 has its inlet end 64 positioned in the lowermost portion of drum 12 at a point which will remain submerged when the water screen is in operation. The outlet 66 of conduit 22 is at the upper end thereof. Conduit 22 is rigidly mounted on frame 14 by a pair of upright members 68 and 70 with which each have a transverse member 72 and 74, respectively secured to their upper end portion. The transverse members 72 and 74 have straps 76 and 78, respectively secured thereto and wrapped around and over conduit 22 as shown in the drawings. The lower portion of conduit 22 is positioned in a spaced relation to the drum frame braces 34 so the drum can rotate freely without the braces interfering with conduit 22. Preferably conduit 22 is positioned as shown so the inlet 64 thereof is in the lower portion of the drum's interior and the mid portion of conduit 22 is adjacent to axle 28.

When water screen 10 of this invention is placed in service in a river, stream, or other moving body of water conduit 22 is connected with a flexible conduit 80 to serve as a coupling between it and a rigid conduit 82 which is in fluid communication with the pump or other means for withdrawing the water. FIG. 1 shows water screen 10 in an installed operating position in a moving body of water 84. In order to stabilize the position of water screen 10 in moving body of water 84 it is necessary to anchor or otherwise secure the water screen so it will maintain an essentially fixed position. In order to anchor water screen 10 anchoring cables 86 and 88 are secured to frame 14 as shown in FIG. 1. Anchor cables 86 and 88 can obviously be connected to a suitable stationary structure. In operating condition drum 12 is partially submerged. Preferably drum 12 is in operation between 10 and 40% submerged. It is necessary that drum 12 be no more than 50% submerged otherwise it would not rotate properly to pass debris around the exterior thereof. When in a submerged condition paddles 38 utilize forces of the moving body of water to transmit forces to axle 28 thereby rotating drum 12 in its rotatably mounted position on frame 14. As drum 12 rotates debris moving downstream in moving body of water 84 will naturally pass between floats 16 and 18 and along the path of the rotating drum 12, whereupon rotating motion of the drum will carry the debris underneath the drum and on downstream. Meanwhile water will pass through the porous perforate mesh covering of drum 12, thereby providing filtered substantially debris free water to be withdrawn from the interior of the drum through conduit 22. Because the water inside drum 12 is filtered it will not cause any flooding or clogging problems in the inlet 64 of conduit 42 or the conduits connected to it which provide fluid communication to the pump. Because water screen 10 is powered by motion of the moving body of water it does not add anything to the power required for pumping water from the moving body of water. The water powered feature of the novel water screen of this invention allows the drum to rotate substantially continuously so it can provide substantially continuous filtering of water for pumping. This is a particularly an important feature in agricultural areas where irrigation from streams, rivers, etc. is essential and must be done in some cases substantially continuously. The water screen 10 of this invention has been successfully used for removing water from a river for agricultural irrigation purposes and it has been found to be quite satisfactory because it fulfills a long felt need in the art by providing a simple, inexpensive and dependable water filter.

In the manufacture of the water screen of this invention, it is obvious that it can be easily constructed to achieve the end product. Water screens substantially as shown and described herein have been in practice constructed without difficulty using common manufacturing and fabricating techniques.

In the use and operation of the water screen of this invention it is seen that same provides a rotary strainer for filtering water from a moving body of water such as a stream. Because the water screen of this invention is powered by motion of a moving body of water it is economically advantageous to operate and use because it provides effective filtering of water for removal from the moving body of water for irrigation purposes. The water screen as shown and described herein has been constructed, used, and found to be quite satisfactory in filtering water as it is removed from a river for agricultural irrigation purposes.

As will become apparent from the foregoing description of the applicant's water screen a relatively simple and inexpensive means have been provided to filter water for removal from a moving body of water. The structure is economical to manufacture, simple in construction, easy to use, and powered by a moving body of water. Furthermore, the structure is particularly well adapted for the removal of substantial quantities of water from a river or the like on an essentially continuous bases or intermittently as needed.

While the invention has been described in conjunction with preferred specific embodiments thereof, it will be understood that this description is intended to illustrate and not limit the scope of the invention, which is defined by the following claims.

I claim:

1. A stream powered, self-cleaning rotary strainer for use in drawing water from a running body of water, the strainer comprising:
   a strainer frame;
   a drum having a perforate sidewall, an open end, and a closed end, said drum rotatably mounted on said strainer frame about its longitudinal axis;
   a plurality of paddles rigidly mounted on the closed end of said drum and extending outwardly therefrom in a spaced relationship around the circumference of the closed end of said drum, said paddles parallel to the longitudinal axis of said drum, said paddles co-acting with the flow of the body of water to rotate said drum on said strainer frame;
   a float assembly rigidly mounted on said strainer frame, said strainer frame and said float assembly constructed and adapted to position said drum in a partially submerged condition in the body of water with the longitudinal axis of said drum disposed transverse to the direction of flow of the body of water; and
   a water withdrawing conduit mounted on said strainer frame and having the inlet inside a lower portion of the perforate sidewall of said drum;
   the rotary strainer being constructed and adapted to, in use, float in a moving body of water wherein said drum is rotated by said paddles passing debris around the sidewall of said drum, the outlet of said conduit being connected in fluid communication with a pump, or the like, for removing water from within said drum.

2. The rotary strainer as described in claim 1 wherein, said strainer frame includes a semi-circular end plate member rigidly mounted thereon and positioned adjacent the open end of said drum, said end plate member covering the submerged portion of the open end of said drum.

3. The rotary strainer of claim 1 wherein, said drum sidewall is cylindrical, said drum further including a drum frame defining the cylindrical shape of said sidewall, said cylindrical sidewall and the closed end of said drum being covered with a porous mesh material.

4. The rotary strainer as described in claim 3 wherein, said drum frame includes a horizontal axle rigidly mounted therein and extending longitudinally through the center of said drum, said axle being rotatably mounted on said strainer frame.

5. The rotary strainer as described in claim 1 wherein, said float includes a pair of elongated float members, said float members being rigidly secured to said strainer frame and disposed adjacent the opposite ends of said drum, said float members positioned on said strainer frame parallel to the direction of the flow of the body of water.

6. The rotary strainer as described in claim 1 wherein, a portion of said conduit is rigidly mounted on said strainer frame by a support member, the inlet of said conduit disposed inside said drum and below the water level in said drum, the conduit extending outwardly from said drum above said semi-circular end plate member and through the open end of said drum.

* * * * *